Sept. 6, 1960  R. N. LAHDE  2,951,376
ANGULAR RATE GYROSCOPE
Filed May 1, 1958

INVENTOR.
REINHARD N. LAHDE
BY
ATTORNEY

United States Patent Office 2,951,376
Patented Sept. 6, 1960

2,951,376
ANGULAR RATE GYROSCOPE

Reinhard N. Lahde, Tarzana, Calif., assignor, by mesne assignments, to Curtiss-Wright Corporation, a corporation of Delaware Filed May 1, 1958, Ser. No. 732,308

3 Claims. (Cl. 74—5.6)

This invention relates to gyro-controlled indicating systems and more particularly, to an improved angular rate gyroscope for indicating angular deviation from a given direction.

Present day gyroscope systems are mainly of two types. First, a free gyroscope which will approximately maintain a fixed position in space regardless of changes in direction in the vehicle in which it is carried, and second, angular rate gyroscopes, which include either mechanical or electrical angular measuring systems for providing an indication of the rate of angular deviation of a vehicle carrying the device. The gyroscope proper employed in these systems is mounted in gimbals, thus requiring caging or other restoring apparatus. The associated detecting and indicating systems usually employ amplifiers and other electrical components for providing the desired information as to the position of the gyroscope. As a consequence present day systems are not only relatively sensitive to shock and the like, but are also complicated, expensive to manufacture, and require considerable maintenance.

Bearing the above in mind, it is a primary object of the present invention to provide a novel angular rate gyroscope system which is extremely simple and rugged compared to present day systems.

More particularly, it is an object to provide an angular rate gyroscope of the above type which is capable of measuring angular rate about two mutually perpendicular axes simultaneously.

Another important object is to provide a device meeting the foregoing objects which may be made substantially insensitive to gravity and other linear accelerations without costly balancing arrangements.

Still another object is to provide an angular rate gyroscope which has relatively good zero accuracy.

Another object is to provide an angular rate gyroscope employing an extremely simple electrical indicating system whereby angular rates may be indicated at remote locations.

These and many other objects and advantages of the invention are attained in a preferred embodiment by providing a simple flywheel mounted on a shaft by a flexible mounting means for rotation with the shaft about a given axis. An insulating member is secured to the shaft for rotation therewith in axial alignment with the flywheel. This member serves to support a plurality of elements capable of generating electrical signals proportional to pressure exerted on the elements. Each of the elements themselves is positioned to engage the front face of the flywheel at fixed radial distances from the shaft. A biasing spring is provided to generate a certain necessary amount of contact pressure between the elements and the flywheel. The shaft also includes a commutation means connected to the elements and cooperating with suitable brush means for picking off signals passed to the commutation means from the elements. The arrangement is such that when the mechanism is subject to an angular deviation, the gyroscopic properties of the flywheel will cause the face of the flywheel to exert a periodic pressure change against some of the elements supported by the insulating member. The corresponding change in the signals is then detected by the brush means and constitutes a function of the force moment exerted by the flywheel which, in turn, is a function of the angular rate of deviation.

In a preferred embodiment, the pressure responsive elements take the form of variable resistances and the signals are provided by a D.C. source connected through suitable fixed resistances across the elements. A slip ring and an additional shaft end contact may be provided for this purpose.

A better understanding of the invention will be had by referring to a preferred embodiment thereof as shown in the accompanying drawings, in which.

Figure 1:
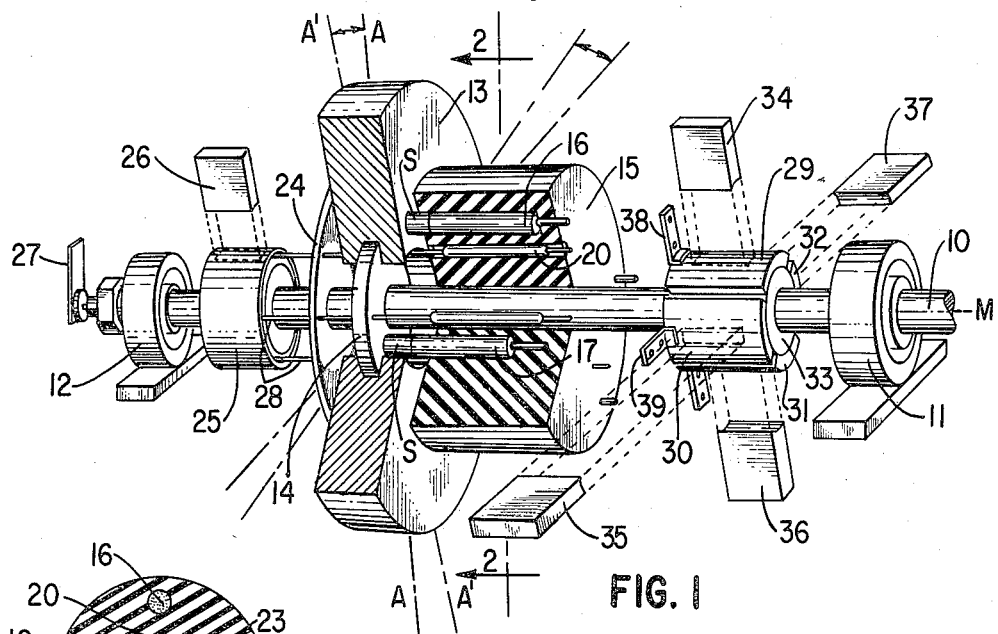
Figure 1 is a schematic partially cut-away exploded perspective view of the basic components of the device.

Referring to Figure 1, the angular rate gyroscope comprises an elongated central shaft 10 supported for rotation in suitable end bearings 11 and 12. Shaft 10 may be rotated by a belt drive or a simple motor, as indicated schematically at M.

Figure 2:
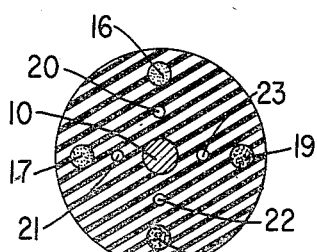
Figure 2 is a cross-section taken in the direction of the arrows 2—2 of Figure 1.

A flywheel 13 is mounted to the shaft 10 by means of a flexible disc-shaped diaphragm 14. Also mounted on the shaft 10 in coaxial alignment is an insulating member 15 supporting several pressure responsive elements such as at 16 and 17. As best seen in Figure 2, four such elements are provided spaced at fixed radial distances from the shaft 10 substantially 90 degrees apart. The two pressure responsive elements not shown in Figure 1 are shown in Figure 2 at 18 and 19.

Each of the elements is supported in such a manner that its pressure responsive area is placed in an engagement with the front face of the flywheel 13. Also supported by the member 15 are a corresponding number of fixed resistances 20, 21, 22, and 23. A conical spring 24 is secured to the shaft 10 and arranged to urge the flywheel 13 axially toward the member 15 such that, in the absence of any angular accelerations, substantially equal pressures are applied to the four variable resistance elements 16, 17, 18, and 19.

A slip ring 25 is positioned on the shaft forward of the spring 24 and provided with a cooperating brush 26. The extreme forward end of the shaft is arranged to be engaged by a contact 27. Suitable wires 28 pass from the slip ring 25 through the spring 24 and flexible diaphragm 14 to connect to the various resistances 20, 21, 22, and 23. The other ends of these resistances, in turn, are arranged to be connected to four segments 29, 30, 31, and 32, respectively constituting a commutation means 33 secured to the shaft 10. Suitable brushes 34, 35, 36, and 37 cooperate with these segments for picking off signals therefrom.

Figure 3:
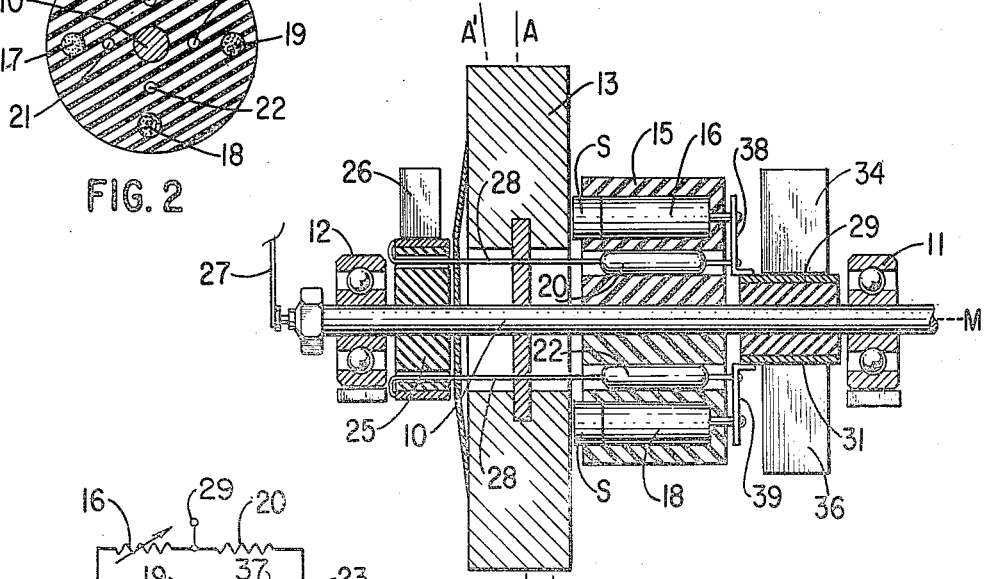
Figure 3 is an elevational cross-section of the entire apparatus shown in Figure 1 in assembled position; and, Figure 4 is a schematic circuit diagram useful in explaining the operation of the device.

As shown best in the assembled cross-sectional view of Figure 3, brackets such as at 38 and 39 may be provided for effecting these connections, as well as effecting connections between the commutator segments and the variable resistances 16, 17, 18, and 19.

With the above described arrangement, it will be evident that if a direct current is applied between the brush 26 and end contact 27, current will flow through the brush 26, slip ring 25, conductors 28, fixed resistances 20, 21, 22, and 23, and thence through the variable resistances 16, 17, 18, and 19, into the front face of the flywheel 13, through the flexible mounting diaphragm 14 and shaft 10 to the end contact 27.

Voltages appearing at the junction of the variable and fixed resistances, in turn, will be picked off by the brushes 34, 35, 36, and 37 in engagement with the commutator segments.

Figure 4:
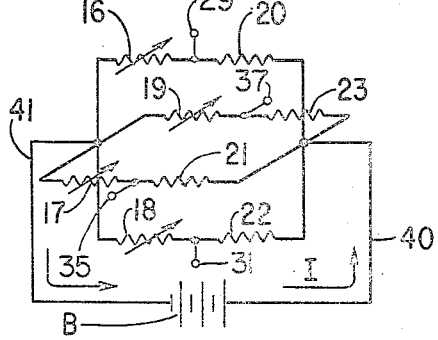

This electrical circuit as described, is illustrated schematically in Figure 4, wherein the direct current source is shown as battery B, the input to brush 26 being provided through conductor 40 and the output at contact 27 being connected back to the other side of the battery through conductor 41. The counterparts to the resistances and commutator segments are indicated in Figure 4 by the same numerals as are used in Figures 1 to 3.

In the operation of the device, assume first that the flywheel 13 is rotating at a rapid rate and the system is not subject to any angular deviation. Under these circumstances, the pressure exerted by the face of the flywheel 13 on each of the variable resistances 16, 17, 18, and 19 will be substantially equal and therefore these resistances will have substantially equal values. As a consequence, the voltage difference between any two diametrically opposed brushes such as 34 and 36, or 35 and 37, will be zero.

Assume now that the system is subject to an angular rate. Because of the gyroscopic properties of the flywheel 13, its axis of rotation will tend to remain fixed in space and thus will tend to move out of alignment with the axis of the shaft 10. Any shift or tilting of the position of the flywheel relative to the shaft, however, is limited to a very small degree by the pressure sensitive elements 16, 17, 18, and 19, since these elements are rigidly carried by the insulating member 15. Thus the tendency for the flywheel to tilt from the position of the line A—A to the exaggerated position designated by the line A'—A' is translated into pressure against the elements superimposed over the constant pressure by the conical spring 24. When the shaft 10 is in the position illustrated in Figure 1, there will thus be an increased pressure on the element 18 below the shaft, and a decreased pressure on the resistance element 16 above the shaft, thereby changing the resistance values of these elements.

Referring to Figure 4, it will be evident that a change in the resistance values of elements 16 and 18 will give rise to a potential difference between the points 29 and 31 corresponding to the segments 29 and 31 of the commutator 33 of Figures 1 to 3.

After the flywheel 13 and member 15 have rotated through 180 degrees, the variable resistance element 18 will then be subject to a decreased pressure, while the variable resistance element 16 will be subject to an increased pressure, but because of the fixed position of the brushes, the voltage detected between the brushes 34 and 36 will be substantially constant. In other words, the commutator functions to rectify the varying signal resulting from rotation of the variable resistances with the flywheel.

It will be immediately evident from the foregoing description that if an angular rate occurs about an axis at right angles to the aforementioned deviation, there will be caused an increase in value in the variable resistance element on one side of the shaft such as 17, and a decrease in the variable resistance element on the opposite side of the shaft such as 19, so that a voltage difference will be developed between the brushes 35 and 37.

As in the case of the other signal between the brushes 34 and 36, the signal between the brushes 35 and 37 is rectified by the commutator segments and is proportional to the peak pressures exerted and thus proportional to the rate of angular deviation.

The signals picked off by the brushes may be relayed to a remote location to provide the desired information.

While a particular embodiment of this invention has been shown and described, it is to be understood that various modifications and changes therein which fall within the scope and spirit of the invention will occur to those skilled in the art. The angular rate gyroscope is therefore not to be thought of as limited to the specific embodiment described and shown.

What is claimed is:

1. A device for measuring angular rate comprising, in combination: a shaft; a mass; means mounting said mass to said shaft for rotation with said shaft with limited movement parallel to the axis of said shaft; a pressure sensitive resistance element having an electrical resistance which changes in response to changes in pressure thereon, said element being in engagement with said mass and mounted to said shaft to rotate with said shaft, said element being in a fixed position insofar as movement parallel to the axis of said shaft is concerned; means for passing direct current through said resistance element to provide an electrical signal which varies in response to changes in the engagement pressure between said mass and said element as a result of angular rate acting on said device; commutating means connected to said element; and stationary detecting means responsive to said commutating means to yield signals which are a function of said angular rate.

2. A device for measuring angular rate comprising, in combination: a shaft; a flywheel; flexible means mounting said flywheel to said shaft for rotation with said shaft about a given axis; a member secured to said shaft for rotation therewith; elements for generating signals in response to pressure exerted thereon supported by said member at fixed radial distances from said shaft and in engagement with one face of said flywheel; commutation means on said shaft connected to said elements; and stationary brush means for detecting signals passed to said commutation means from said elements.

3. The subject matter of claim 2, in which said elements comprise resistances having values which are a function of pressure, and in which said device includes a biasing spring urging said flywheel against said resistances; a slip ring on said shaft and associated brush therefor; constant resistances connected between said commutation means and said slip ring; a contact; means electrically connecting said contact to said flywheel; and a source of electrical energy connected between said associated brush and said contact.

References Cited in the file of this patent

UNITED STATES PATENTS

| | | |
|---|---|---|
| 1,801,619 | Arrea | Apr. 21, 1931 |
| 2,567,682 | Silberstein | Sept. 11, 1951 |
| 2,716,893 | Birdsall | Sept. 6, 1955 |
| 2,725,750 | Togstad | Dec. 6, 1955 |